United States Patent Office 3,657,206
Patented Apr. 18, 1972

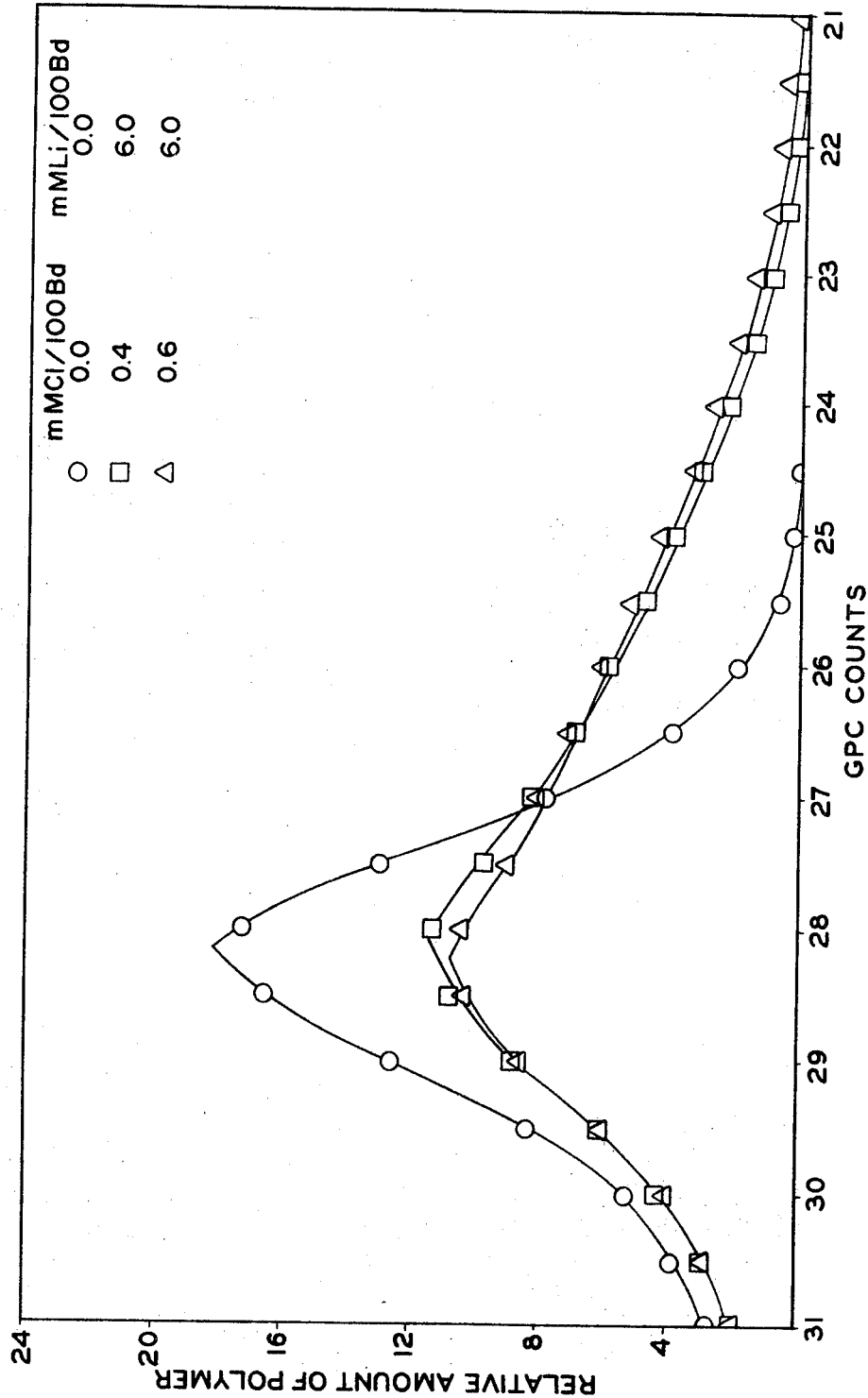

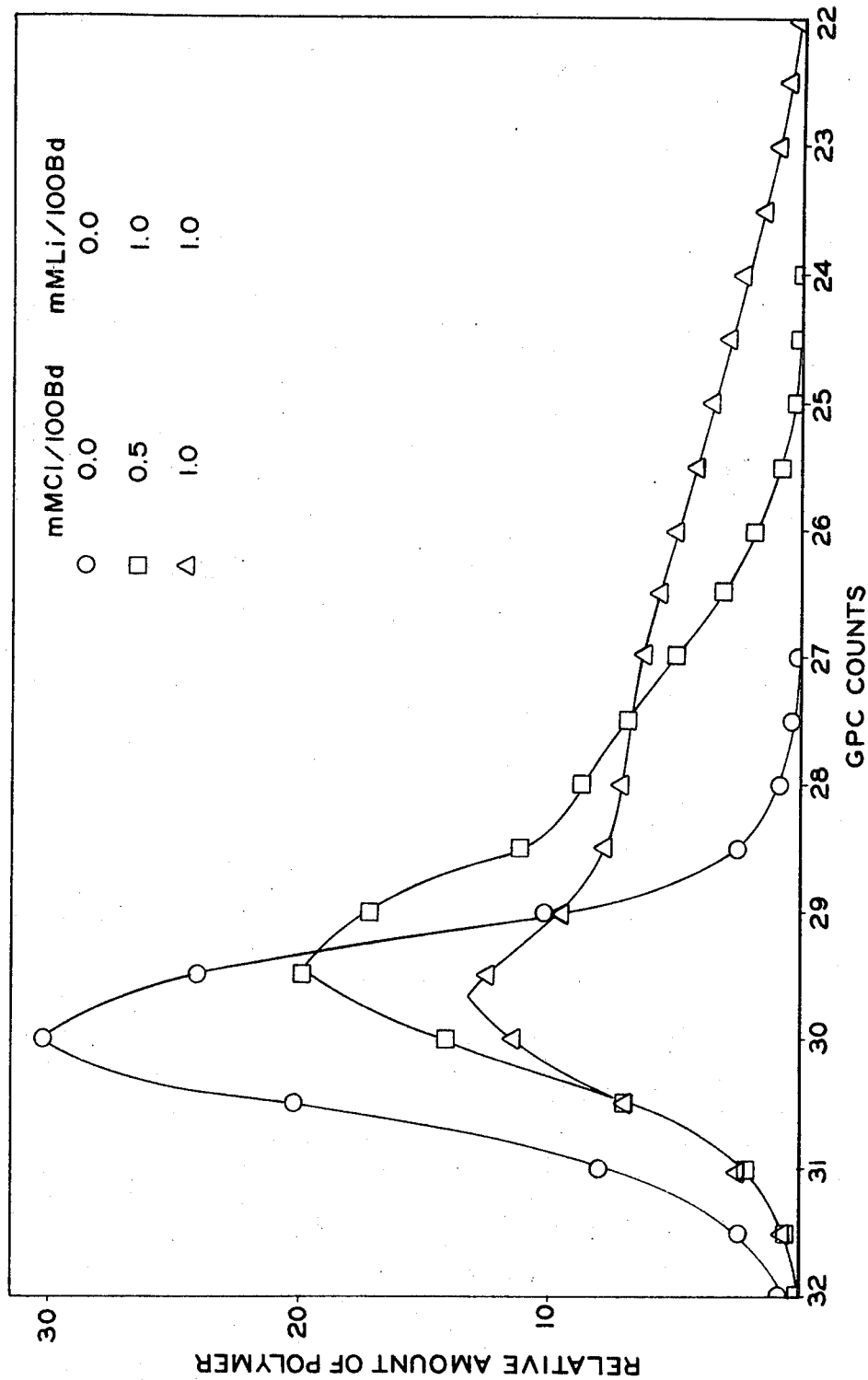

3,657,206
JOINING DEAD POLYMERS
Adel F. Halasa, Bath, Ohio, assignor to The Firestone Tire & Rubber Company, Akron, Ohio
Continuation-in-part of application Ser. No. 575,967, Aug. 30, 1966. This application Oct. 8, 1969, Ser. No. 864,699
Int. Cl. C08d 5/02, 5/04
U.S. Cl. 260—85.1                9 Claims

ABSTRACT OF THE DISCLOSURE

Dead polymers, whether liquid or solid, with a molecular weight of 1,000 to 2,000,000, derived at least in part from a diene monomer, are joined with halogenated joining agents to produce a rubber of greater molecular weight.

---

This application is a continuation-in-part of my application Ser. No. 575,967 filed Aug. 30, 1966 (now abandoned).

The invention relates to novel branched polymers and to a novel method of making them. The term "polymer" is used herein to include both homopolymers and copolymers.

Rubbery polymers of diene monomers often are difficult to fabricate into useful shapes and commercially practical products or are deficient in physical properties desired for such shapes or products. Such polymers include homopolymers of conjugated dienes of 4 to 6 carbon atoms (e.g. butadiene, piperylene, isoprene, 2,3-dimethylbutadiene) and copolymers thereof (e.g. butadiene-isoprene, piperylene-butadiene, etc.) and copolymers of such conjugated dienes with isobutylene (butyl rubber), styrene, a hydrocarbon-substituted styrene such as methylstyrene and ethylstyrene, copolymers of butadiene and isoprene with styrene or such substituted styrenes, natural rubbers, chloroprene and copolymers thereof with butadiene and/or isoprene and/or styrene or an EPDM rubber (i.e. a rubber in which ethylene and propylene are copolymerized with an unconjugated diene monomer of about 5 to 12 carbon atoms which may be dicyclopentadiene, cyclooctadiene, hexadiene-1,4, methylene norbornene, ethylidene norbornene or other nonconjugated diolefin. Block copolymers as well as other copolymers can be used. The foregoing include the so-called stereo rubbers which have been of great interest in recent years, but the properties of most of these new synthetic rubbers have not been completely satisfactory for all uses, as witness the widespread practice of blending such rubbers with natural rubbers or emulsion SBR.

The stereo rubbers may be produced by polymerization of isoprene or butadiene-1,3 by means of a catalyst which is a hydrocarbon-soluble hydrocarbon derivative of an alkali metal, for example, an alkyl, alkenyl, cycloalkyl, cycloalkenyl, aryl or alkaryl derivative. Preferred linear polymer of diene monomers is prepared by polymerization of a conjugated diolefin containing 4 to 6 carbon atoms by means of a lithium-hydrocarbon catalyst in the absence of air and moisture; copolymers of butadiene and isoprene or of either or both such diolefins with styrene or methylstyrene are produced by the same technique.

The preferred polymerization catalyst is n-butyllithium. Derivatives of the alkali metals (and particularly lithium, sodium and potassium) which are catalysts include the ethyl, butyl, amyl, hexyl, cyclohexyl, 2-ethylhexyl, n-dodecyl, n-hexadecyl, allyl, benzyl, crotonyl, cyclohexenyl, camphyl, isobornyl, phenyl, tolyl, xylyl, naphthyl and xenyl alkali metals as well as di-metal derivatives which include derivatives of ethylene, trimethylene, tetramethylene, decamethylene and octadecamethylene; 1,2-dimetalated propane, 1,4 - dimetalated benzene, 1,5 - dimetalated naphthalene, 1,2 - dimetalated - 1,3 - (diphenyl) propane, etc. The polymerizations are usually carried out at atmospheric pressure, but pressure greater and less than atmospheric may be employed. The reaction is advantageously carried out in a hydrocarbon compound, preferably a non-ether and usually pentane or hexane, usually at an elevated temperature below the temperature of the boiling point of the solvent, but higher temperatures may be used and temperatures as low as −70° C. or lower may be employed. A small amount of the catalyst is all that is required, and usually from about 0.001 to about 0.5 gram of catalyst will be employed for each 100 parts of the monomer. Such linear polymers are characterized by high 1,4-content (85–95% of polymer derived from butadiene or isoprene), when produced in a hydrocarbon solvent. They are characterized by high linearity and narrow molecular weight distribution. The vulcanizates of such polymers are characterized by excellent physical properties, including high resiliency, low hysteresis, excellent resistance to abrasion, low runing temperatures and excellent flexibility and retention of other good physical properties at extremely low temperatures typical of the Arctic in winter, all in comparison with standard emulsion polymerizates, such as commercial SBR. However, such lithium-catalyzed polymers are more difficult to process in standard rubber equipment, such as Banbury mixers, mills and tubers, as compared to natural rubber and conventional (emulsion) SBR, so that they are usually mixed with natural rubber and/or SBR for commercial use. Certain of such polymers produced by lithium catalysts also possess undesirable cold-flow properties.

There are other diene polymers produced by polymerization of butadiene and/or isoprene with or without other monomers, e.g., styrene, etc., by means of other catalysts. Polymers of lower 1,4-content are produced by lithium catalysts in the presence of Lewis bases. All such diene polymers may be treated by the process of this invention.

It is an object of the invention to overcome the disadvantages of any such polymers of diene monomers, to provide novel branched polymers of high molecular weight having unexpectedly improved properties and to provide a novel method of making the novel polymers.

The polymers used in the invention have the chemical compositions of rubbers. Often they are liquids (having molecular weights of 1,000 to 30,000) or soft rubbers (having average molecular weights up to about 300,000), but useful results are obtained with polymers of higher molecular weights (as high as about 2,000,000). Rubbery products are obtained by joining polymers of such lower molecular weights.

In accordance with the invention, the polymer treated is a dead polymer, i.e. it is substantially entirely free of "live ends" and is no longer active in polymerization reactions. A relatively low molecular weight dead polymer or copolymer derived at least in part from a diene monomer, is reacted with a halogen-containing joining agent which comprises a saturated or unsaturated, straight- or branched-chain or cyclo-containing aliphatic hydrocarbon which includes one to twenty or fifty or more carbon atoms per molecule or an aromatic hydrocarbon and which comprises one, two, three or four or more halogens attached to terminal or other carbon atoms, or the halogen or halogens may be on an aliphatic or aromatic silicon- or tin-containing compound in which the halogen or halogens are attached to such metal. The halogen or halogens of the joining agent may be fluorine, chlorine, bromine and/or iodine or a mixture of halogens. The joining agent may comprise other active groups. Such active groups may or may not enter into the joining reaction. Such active groups include ketone, aldehyde, ether, hydroxy, oxide, nitro-vinyl, ester, anhydride, amine, acid, thio, sulfonate, sulfide and unsaturated, etc. groups. The joining action is carried out in the presence of a hydrocarbon-soluble aliphatic or cyclic hydrocarbon compound of an alkali metal, preferably a lithium compound but it is commercially feasible to use sodium and potassium compounds.

The joining agent may be a low molecular weight compound (e.g., a halogen-containing lower alkyl halide) or a halogen-containing high molecular weight compound such as a polymer (e.g., neoprene, polyvinylchloride, chlorinated rubber, etc.). Other examples are methylbromide, ethyl chloride, ethyl bromide, ethylene dibromide, propyl bromide, isopropyl chloride, 1-iodopropane, formyl chloride, formyl iodide, acetyl bromide, secondary butyl chloride, tertiary butyl chloride, tertiary amyl bromide, tt-octyl chloride, 1,5 - dichloropentane and 1,5 - dibromopentane, 1-chloropropane, 2-chloropropane, 1-chloro-n-butane, 2-chloro-n-butane, 1-chloro-2-methylpropane, 2-chloro-n-pentane, 2-chloro-3-methyl-n-butane, 2,3,4-trichloro-n-hexane, 1-chloro norbornene, 1-chloro alpha and beta pinenes, 1-chloro cyclopentadiene, 1,2-dichloro cyclopentadiene, a mixture of monochlorinated or otherwise halogenated dodecanes, a polyvinyl chloride having a molecular weight of up to about 1000 or more, allyl chloride, methallyl chloride, 3-chlorobutene-1, cyclohexyl chloride, 1,4-dichlorocyclohexene, 4-chloro-cyclohexene, cycloheptyl chloride, propargyl chloride, styrylchloride, cyclohexylmethyl chloride, 2-chloro-butadiene-1,3, 1,2-dichlorobutane, 2,3-dichloro-butane, 1,2,3-trichlorobutane, 1,2,3,4-tetrachlorobutane, 1-bromopropane, 2-bromopropane, 1-bromo-n-butane, 2-bromo-n-butane, 1-iodo-2-methylpropane, 1,3-bromo-2-methylpropane, 2-iodo-n-pentane, 2,4-diiodo-n-pentane, 2-bromo-3-methyl-n-butane, 2,3,4-tribromo-n-hexane, a mixture of mono-brominated dodecanes, benzyl bromide, phenethyl bromide, 1-phenyl-2-iodopropane, 2-(p-bromo-phenyl)-3-bromo-butane, allyl bromide, methallyl iodide, 3 - bromo-butene - 1, styrylbromide, bis(bromomethyl)-benzene, 1,3,5 - (tribromomethyl) benzene, bis(iodomethyl)-naphthalene, cyclohexyl bromide, 1,4 - diiodo-cyclohexene, 4 - bromo- cyclohexene - 1, cyclohexylmethyl iodide, cycloheptyl bromide, propargyl bromide and 2 - iodobutadiene - 1,3, bis(1 - bromoethyl) ether, 1,3 - dichloro - 2 - propane, 1,5 - dichloro - 2,4 - pentadione, bis(1-fluoropropyl) ether, 1-chloromethyl - 4 - (1 - chloro-n-propyl) benzene, 1,4 - dichloro - 2 - hexane, 4-chloro-2-heptane, 2,5,6,9-tetrachloro - 3,7 - decadiene, bis(1 - iodoamyl) ether, bis[1 - chloro(2 - butyl)ethyl] ether, chloromethyl methyl ether, 1,2 - dichlorobenzene, 1,3 - dibromobenzene, 1,4-dichlorobenzene, 1 - chloro - 4 - bromobenzene, 1,3,5-trichlorobenzene, 1,2,4,5 - tetrabromobenzene, hexachlorobenzene, 1,2 - dichloronaphthalene, 1,4 - dibromonaphthalene, 1,8 - dichloronaphthalene, 1,2,7,8 - tetrachloronaphthalene, 2,6 - dichloroanthracene, 1,5,9,10 - tetrabromoanthracene, 2,2′ - dibromobiphenyl, 2,5 - dichlorobiphenyl, silicon tetrachloride, tin tetrachloride, and the following.

$$Cl-Si-CH_2CH_2-Si-Cl$$
$$\quad\;\;|\quad\quad\quad\quad\;\;|$$
$$\quad\;\;CH_3\quad\quad\quad CH_3$$

$$Cl-Si-(CH_2)_x-Si-Cl$$
$$\quad\;\;|\quad\quad\quad\quad\;\;|$$
$$\quad\;\;CH_3\quad\quad\quad CH_3$$

$$CH_3-Si-Si-CH_3$$
$$\quad\quad|\;\;\;|$$
$$\quad\;\;Cl\;Cl$$

$$\quad\quad\quad Cl\quad\quad Cl$$
$$\quad\quad\quad |\quad\quad\;\;|$$
$$CH_3-Sn-CH_2-Sn-CH_3$$
$$\quad\quad\;\;|\quad\quad\quad\;\;|$$
$$\quad\;\;CH_3\quad\quad\quad CH_3$$

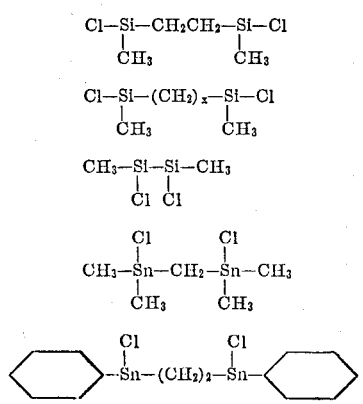

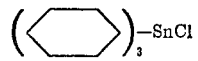

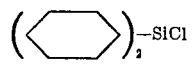

In the foregoing structural formulae, $CH_3$ may be replaced by any alkyl group containing up to 10 or more carbon atoms, and chlorine may be replaced by other halogens.

Other polymeric joining agents include the following in which P may be polybutadiene, polyisoprene, butadienestyrene copolymer, etc., and chlorine may be replaced by any other halogen.

P—Cl
Cl—P—Cl
Cl—P—CH₃Cl
Cl—P—CH—C=C—Cl
Polyvinylchloride
Neoprene
Vinylidene chloride polymers and copolymer with other monomers The joining agent may be any halogenated joining agent which is effective in joining rubber polymers.

The alkali metal compounds used for joining include, for instance, the alkyl lithiums including alkyl groups (straight and branched chain) of 1 to 10 or 20 or more carbon atoms, the hydrocarbon lithium catalysts listed above and the corresponding sodium and potassium compounds. The alkali metal compounds which are soluble in a hydrocarbon solvent, such as pentane, hexane, benzene or similar solvents are useful for forming a solution (cement) of the polymer of a diene monomer to be reacted in accordance with the invention. The use of compounds of sodium and potassium may present some difficulties because of their relative lack of solubility in the hydrocarbon solvents.

The process of the invention includes reactions of one or more polymers of which at least one is dead, with one or more halogen-containing joining reagents, in the presence of an alkali metal compound such as described. The process of the invention is carried out at any temperature at which appreciable reaction occurs, generally in the range of —50° or —75° C. to 275° C. and preferably in the range of 0° C. to 150° C. The reaction may be carried out under reduced pressure, atmospheric pressure or at super-atmospheric pressures. Especially when the reaction is conducted in a volatile solvent or solvent mixture containing a volatile fraction, super-atmospheric pressures are convenient to allow use of reaction temperatures above those to which the reaction would be confined at atmospehric pressure. The reaction temperatures required for joining, using n-butyl lithium and a fluoride or iodide joining agent, are in general higher than that required with a chloride or bromide joining agent. In the reaction of the invention there is normally utilized sufficient alkali metal compound to provide from 0.01 to 10 and preferably 0.1 to 1.0 equivalent of alkali metal per atom of halogen contained in the halogen-containing compound. The mechanisms by which the reaction of the invention increases molecular weights of polymers is not known but may involve formation of radicals of which the halogen-containing compounds are precursors.

The conventional dead polymer results from neutralizing a live polymer by reaction with an acidic substance, water, an alcohol, an amine, a "stopping agent," an antioxidant or polymer stabilizer, or other stopping agent as is known in the synthetic rubber art.

We feel that this joining reaction is caused by one electron transfer from the alkali metal compound to the halogen compound which causes the joining. Similarly, joining can be explained by a transient radical intermediate. The products are to be distinguished from those obtained by reaction with carbenes, as described in Lundberg 3,369,012; no halogen has been found in the polymer products made by the process of this invention.

For a continuous operation, using a dead polymer, it will generally be advantageous to use an alkyl halide in an inline mixer with alkyllithium, or the alkyl halide and alkyllithium may be fed to the mixer through separate lines.

The novel polymers produced by the invention from polymers obtained with hydrocarbon-lithium catalysts, are characterized by improved processing properties, in comparison with polymers which have not been reacted in accordance with the invention or in comparison with similar polymers produced by other catalysts, such as Ziegler catalysts, etc., and having molecular weights comparable to those of the novel polymers. The novel polymers are rubbery and behave in rubber mills, Banbury mixers and extruders as satisfactorily as do emulsion polymers of the conventional SBR types. The novel rubbery polymers are readily utilized in practical rubber compounds without admixture of natural rubber or conventional SBR, although such other rubbers may be mixed with the novel polymers if desired.

The novel polymers have higher average molecular weights, normally averaging 20 percent to several hundred percent higher than the average molecular weight of the polymer before reaction in accordance with the invention. The novel polymers are much less linear than the linear starting polymers and are often highly branched. They have broadened molecular weight distribution. The preferred products are solids with reduced (or no) tendency to cold-flow and present no packaging or shipping problems. The novel rubbery polymers can be extensively diluted with oil (as with 37.5 parts oil per 100 parts polymer) without objectionable cold-flow.

The preferred rubber polymers provide vulcanizates having higher moduli than comparable vulcanizates of comparable prior art polymers. This property enhances the value of the novel polymers for many industrial uses, and especially in tire treads and carcass compositions. Surprisingly, they possess the high resilience, high efficiency, low running temperature, high dynamic modulus and low internal friction properties characterizing the starting polymers, and hence are much superior in these respects to vulcanizates of conventional emulsion polymers.

The process of the invention increases the molecular weight of polymers and reduces linearity, producing branching and/or cross-linking; it can be utilized, if desired to cross-link a polymer to a stage where the novel polymer displays vulcanizate properties. Such novel "vulcanizates" have advantages because the cross-links in their structures do not involve sulfur or oxygen linkages but carbon-to-carbon cross-links.

FIGS. 1 and 2 are gel-permeation chromatograph (G.P.C.) curves showing the shift in properties of polymers by joining as explained in Example 9.

The invention is illustrated by the following examples, in which parts are expressed by weight unless otherwise indicated.

EXAMPLE 1

A series of polybutadienes was prepared in bottles by charging 200 ml. of a hexane solution containing 30 grams of butadiene-1,3 to each bottle. To each bottle was added 0.61 millimole of butyllithium, sufficient for neutralizing impurities and for catalyzing polymerization. The bottles were removed from the polymerization bath and neutralized with alcohol to kill the live polymer and then certain additions were made. One bottle was kept stoppered as a sample of the starting polybutadiene, to provide Polymer 1A, a control. To a second bottle there was added 0.84 millimole of additional butyllithium and the bottle was again sealed. To the remaining bottles there were added increasing amounts of additional butyllithium and varying amounts of secondary butyl chloride as the halogen-containing joining agent of the invention. Data are shown in Table I.

TABLE I

| Polymer | Millimoles butyllithium | Millimoles butyl chloride |
| --- | --- | --- |
| 1A | None | None |
| 1B | 0.84 | None |
| 1C | 1.68 | 0.05 |
| 1D | 2.20 | 0.10 |
| 1E | 2.52 | 0.15 |
| 1F | 3.36 | 0.50 |
| 1G | 4.2 | 1.0 |

The seven bottles were then place in a 70° C. bath for two to six hours and agitated therein in a conventional manner. The bottles were removed from the bath and opened. The contents of each bottle was coagulated by methanol in the usual manner, and each coagulum was dried. The resulting Polymers 1A and 1B were both soft and gummy, indicating that the two polymers were substantially identical; Polymers 1C through 1G were progressively more tough and nervy, showing that the molecular weights of these five polymers had been substantially increased by reaction with the additional n-butyllithium and the secondary butyl chloride.

EXAMPLE 2

A series of bottles containing polyisoprene was prepared in a manner analogous to the manner of preparing the starting polybutadiene polymers of Example 1, using a purified solution of isoprene in hexane, and a total of only 0.24 millimole of n-butyllithium in each bottle. Upon completion of the polymerizations, the polyisoprene in each bottle was killed. One bottle, Bottle 2A, containing dead polyisoprene polymer, was retained as a control. Additional butyllithium was added to the remaining bottles, one of which, Bottle 2B, was then sealed to serve as a control. To two other bottles, Bottles 2C and 2D, containing dead polymer, there was added different amounts of secondary butyl chloride. Data are shown in Table II.

TABLE II

| Bottle | Millimoles butyllithium | Millimoles butyl chloride |
| --- | --- | --- |
| 2A | None | None |
| 2B | 4.2 | None |
| 2C | 4.2 | 0.5 |
| 2D | 2.1 | 0.25 |

The bottles were placed in a 70° C. bath for four to six hours and agitated therein in a conventional manner. The bottles were removed from the bath and opened. The contents of Bottles 2A and 2B were coagulated by methanol and dried; the dried polymers were soft, gummy rubbers. The contents of Bottles 2C and 2D were both gelled, showing that considerable cross-linking or branching had resulted from reacting the polyisoprene with both butyllithium (as the alkali metal compound) and secondary butyl chloride (as a halogen-containing compound).

EXAMPLE 3

Butadiene-1,3 (BD) was polymerized in hexane solution, using different amounts of n-butyllithium (BuLi) as initiator, at 50° C. for 18 hours, and then the lithiated polymers were killed with methanol. Samples of the dead polymer were joined by heating with sec.-butyl chloride (sec.BuCl) and n-butyllithium (n-BuLi) at 70° C. for 12 hours. In joining molecules of the dead polymer, the n-butyllithium was used as the base. Details of the reactions and polymers are given in Table III. The Mooney viscosity (ML/4/100° C.) is given for the polymer, both before and after joining.

TABLE III

| Run | Polymerization of BD | | Initial polymer | Joining conditions | | Physical properties of polymers | | |
|---|---|---|---|---|---|---|---|---|
| | Mmole BuLi | ML/4 at 100° C. | | Mmoles of sec. BuCl | Mmoles of n-BuLi added | ML/4 at 100° C. | DSV[1] | Gel |
| 3A | 0.75 | 10 | Dead | None | None | 10 | 1.0 | None |
| 3B | 0.75 | 10 | do | 0.35 | 1.24 | 169.2 | | 91.2 |
| 3C | 0.75 | 10 | do | 1.75 | 1.55 | 144 | | 95.2 |
| 3D | 0.75 | 10 | do | 3.50 | 1.86 | 145 | | 96.1 |
| 3E | 0.75 | 10 | do | 5.25 | 2.48 | 156 | | 96.1 |
| 3F | 0.75 | 10 | do | 2.00 | 2.17 | 130.5 | | 98.0 |
| 3G | 0.47 | 7 | do | 0.05 | 1.24 | 60.3 | | |
| 3H | 0.47 | 7 | do | 0.05 | 2.47 | 144.0 | | |

[1] Dilute solution viscosity. ASTM-D 1601-61, Pt 27, June 1967, page 531.

Table III shows that the dead polymer at the start of the joining reaction had a Mooney viscosity value of 7 or 10, and the reaction of the dead polymer with different amounts of sec.-butyl chloride in the presence of different amounts of the alkali metal compound (n-butyllithium) produced polymers of increased Mooney viscosity values. The production of gel shows that the reaction was severe. The amount of gel can be controlled by varying the ratio of the alkali metal compound and the joining agent, and can be practically eliminated. The gel filtered through a gel screen, indicating that it is a cross-linked gel rather than an extremely high molecular weight material.

EXAMPLE 4

Polybutadiene was prepared by polymerizing butadiene-1,3 in hexane with n-butyllithium, as initiator, at 70° C. After the polymerization was complete, methanol was added to remove active lithium. Molecules of the dead polymer were joined by heating with n-chlorododecane at 50° C. for six hours, using 0.40 millimole of n-butyllithium per mole of polymer as the alkali metal compound. In the table, the dead polymer is indicated as that of Run 4A, and the joined polymers are identified as produced in Runs 4B and 4C. The amount of chloride and initiator used in each joining reaction, and the properties of the polymers are recorded in Table IV.

TABLE IV

| Run | Joining reaction | | | Properties of final polymer | |
|---|---|---|---|---|---|
| | Chloride, mmoles | BuLi, mmoles | DSV | ML/4 at 100° C. | Williams[1] Recovery |
| 4A | None | 1.50 | 1.14 | 5 | 0.08 |
| 4B | 0.40 | 6.00 | 1.66 | 140 | 7.05 |
| 4C | 0.40 | 4.50 | 3.10 | 150 | 7.60 |

[1] In accordance with ASTM designation: D926-56, published in ASTM Standards On Rubber Products, pages 472-474 (1957), except that tests were made at room temperature (about 23° C.), no talc was used and recovery values are actual measurements in mm.

The increases in DSV, Mooney viscosity and Williams Recovery values show that joining occurred.

EXAMPLE 5

The polybutadiene of Run A of Example 4 was used in Example 5. Molecules of this dead polymer (produced by addition of methanol to the polybutadiene solution) were joined by heating with cyclohexyl chloride at 50° C. for six hours with 0.40 millimole of n-butyllithium per mole of polymer as the alkali metal compound. The amounts of chloride and initiator used are recorded in Table V with properties of the joined polymers.

TABLE V

| Run | Joining reaction | | | Properties of final polymer | |
|---|---|---|---|---|---|
| | Chloride, mmoles | BuLi, mmoles | DSV | ML/4 at 100° C. | Williams Recovery |
| 5A | None | 1.50 | 1.14 | 5 | 0.06 |
| 5B | 0.50 | 3.0 | 1.71 | 145.0 | 6.57 |
| 5C | 1.50 | 1.50 | | 138.0 | |

The increases in DSV, Mooney viscosity and Williams Recovery values shows that a joining reaction occurred.

EXAMPLE 6

Butadiene-1,3 was polymerized for 16 to 18 hours at 50° C. to a Mooney viscosity (ML/4/100° C.) of 17 with 0.62 millimole of n-butyllithium and then methanol was added to react with the active lithium. The resulting solution of the dead polymer was heated at 70° C. for 12 hours with sec.-butyl chloride using n-butyllithium as the alkali metal compound. The reaction mixture was neutralized with tert.-butyl alcohol. The conditions of the reactions and properties of the products are summarized in Table VI. Run 6A is a control produced at 70° C.

TABLE VI

| Run | Joining reaction | | Properties of final polymer | | |
|---|---|---|---|---|---|
| | Chloride, mmole | n-BuLi, mmoles | ML/4 at 100° C. | DSV | Gel |
| 6A | None | None | 16.5 | 1.74 | None |
| 6B | 0.20 | 3.0 | 79.0 | 2.23 | None |
| 6C | 0.30 | 3.0 | 75.5 | 2.51 | None |
| 6D | 0.40 | 3.0 | 171.0 | 4.47 | None |
| 6E | 0.60 | 3.0 | 176.0 | 4.25 | 8.8 |

The increases in Mooney viscosity and DSV show that joining occurred.

EXAMPLE 7

Dead polybutadiene, too soft for a Mooney determination (that is with a Mooney viscosity of less than 5), prepared with n-butyllithium initiator was joined by reaction with sec.-butyl bromide, using n-butyllithium as the alkali metal compound. The properties of the dead polymer and the conditions and properties of the final product are recorded in Table VII. The effect of the joining agent reaches a maximum and then lessens.

TABLE VII

| Run | Joining reaction | | | Properties of polymer | |
|---|---|---|---|---|---|
| | Bromide, mmoles | BuLi, mmole | Hrs. at 70° C. | ML/4 at 100° C. | Williams Recovery |
| Control | 0 | 0 | | 5 | 0.06 |
| 7A | 0.4 | 0.62 | 1 | 43 | 0.46 |
| 7B | 0.4 | 0.62 | 2 | 40 | |
| 7C | 0.4 | 0.62 | 3 | 39 | |
| 7D | 0.6 | 0.62 | 1 | 35 | 1.14 |
| 7E | 0.6 | 0.62 | 2 | 42 | |
| 7F | 0.6 | 0.62 | 3 | 45 | |
| 7G | 1.0 | 0.62 | 1 | 30 | 0.77 |
| 7H | 1.0 | 0.62 | 2 | 26 | |
| 7I | 1.0 | 0.62 | 3 | 33 | |

The increases in Mooney viscosity and Williams Recovery show that joining occurred.

EXAMPLE 8

A solution of about 16 percent of a copolymer of styrene and butadiene of substantially constant composition (i.e. without an appreciable percentage of polystyrene blocks) was prepared from 10.8 grams of styrene and 38.4 grams of butadiene-1,3 by polymerization in a hydrocarbon solvent using n-butyllithium as catalyst. The active lithium was removed from the live copolymer by addition of methanol. The resulting dead copolymer had a Mooney viscosity (ML/4/100° C.) of 27. To a 16 percent solution of the copolymer in a hydrocarbon solvent at 70° C. one millimole of n-butyllithium and .8 millimole of sec.-butyl chloride was added. Within several hours a copolymer with a Mooney viscosity (ML/4/100° C.) of 120 was obtained.

EXAMPLE 9

Butadiene-1,3 was polymerized to a Mooney viscosity (ML/4/100° C.) of 5. The reactions were neutralized with sufficient methanol to obtain dead polymer. In two different runs, this polymer was joined using two different ratios of sec.-butyl chloride as the joining agent and n-butyllithium as the alkali metal compound. These are given as the millimoles of chlorine (Cl) and lithium (Li) per 100 grams of butadiene (Bd). The joining reactions were carried out at 70° C. The different polymers were examined by gel-permeation chromatography and the curves obtained are reproduced as FIGS. 1 and 2. In each of the sets of curves, the control is plotted with circles and the curves obtained with the polymers produced using the conditions shown in the respective legends, are plotted with squares and triangles. The curves of the joined polymers show a shift from a lower molecular weight to a higher molecular weight. The long, high-molecular-weight tails are typical of the distribution expected for random cross-linking. It is possible to produce gel in such polymers by adding sufficient joining agent and alkali metal compound. By adding excessive amounts completely insoluble polymers are obtained. This and the shapes of the curves are indicative of predominantly random cross-linking reactions.

The novel polymers can be blended with other known polymers to provide useful commercial compositions for fabrication into useful shapes and articles. The novel rubbery polymers are advantageously blended with known rubbers (e.g., natural rubber, butadiene-styrene copolymer, polybutadiene, polyisoprene, isoprene-isobutylene copolymer, chloroprene, isoprene-styrene copolymer), with or without extending oils, for forming vulcanizates of great technical importance. The novel rubbery polymers are advantageouly compounded with the known reinforcing carbon blacks to produce useful commercial stocks, which may also contain one or more additional rubbery polymers, and may also contain 5 to 100 p.h.r. (parts per 100 parts of the rubber) of extending oil or plasticizer. Sulfur and other known vulcanizing agents for natural rubber and the commercial synthetic rubbers are useful for forming vulcanizable stocks containing a novel polymer of the invention. Known antioxidants, stabilizers and antiozonants for natural and commercial synthetic rubbers find similar utility in compositions containing the novel polymers of the invention. Known methods of mixing, forming, fabricating and curing compositions of natural and commercial synthetic rubbers are applicable to and useful with compositions containing the novel polymers of the invention. The novel polymers of the invention are especially useful in pneumatic tire tread, sidewall and carcass compositions, and the considerations of this paragraph are especially relevant to the use of the novel polymers in tires.

I claim:
1. The process of making a relatively high molecular weight, non-linear rubber polymer from one or more dead, relatively low molecular weight polymers derived at least in part from a diene monomer, which process comprises treating the dead polymer in the presence of a metalated aliphatic or cyclic hydrocarbon selected from the class consisting of sodium hydrocarbons, potassium hydrocarbons and lithium hydrocarbons with a joining agent which is from the class consisting of (a) halogen-containing silicon and tin hydrocarbons, (b) halogenated hydrocarbons and (c) halogenated hydrocarbons substituted with a group selected from the class consisting of ketone, aldehyde, ether, hydroxy, oxide, nitro-vinyl, ester, anhydride, amine, acid, thio, sulfonate and sulfide groups, using 0.1 to 10 equivalents of alkali metal per atom of halogen in the joining agent.

2. The process of claim 1 in which the polymer is polybutadiene.

3. The process of claim 1 in which the polymer is polyisoprene.

4. The process of claim 1 in which the polymer is a copolymer of butadiene and styrene.

5. The process of claim 1 in which the alkali metal compound is a lower alkyllithium.

6. The process of claim 1 in which the joining agent is secondary butyl chloride.

7. The process of claim 1 in which the polymer is obtained with a lithium-based catalyst.

8. The process of claim 1 in which the polymer is obtained with butyllithium and short-stopped with alcohol.

9. The process of claim 1 in which the rubber polymer is from the class consisting of polybutadiene, polyisoprene and copolymers thereof with styrene, the metalated hydrocarbon is butyllithium and the joining agent is an aliphatic halide of chlorine or bromine.

References Cited
UNITED STATES PATENTS

| | | | |
|---|---|---|---|
| 3,078,254 | 2/1963 | Zelinski et al. | 260—45.5 |
| 3,135,716 | 6/1964 | Uraneck et al. | 260—45.5 |
| 3,281,383 | 10/1966 | Zelinski et al. | 260—23.7 |
| 3,318,862 | 5/1967 | Hinton | 260—94.2 |
| 3,492,369 | 1/1970 | Naylor | 260—879 |

JAMES A. SEIDLECK, Primary Examiner

W. F. HAMROCK, Assistant Examiner

U.S. Cl. X.R.

260—82.1, 94.7 R, 94.7 HA, 96 R

UNITED STATES PATENT OFFICE
CERTIFICATE OF CORRECTION

Patent No. 3,657,206    Dated April 18, 1972

Inventor(s) Adel F. Halasa

It is certified that error appears in the above-identified patent and that said Letters Patent are hereby corrected as shown below:

Col. 2, line 5, "pressure", second occurrence, should read -- pressures --.

Col. 5, line 47, "weight" should read --weights--

Col. 7, Table III, sixth column, last line, "2.47" should read --2.48--

Signed and sealed this 26th day of September 1972.

(SEAL)
Attest:

EDWARD M. FLETCHER, JR.
Attesting Officer

ROBERT GOTTSCHALK
Commissioner of Patents